Jan. 27, 1953  F. P. RUSSO  2,626,644
OVERLOAD RELEASE FOR PITTER DRIVE MECHANISMS
Filed Aug. 9, 1949  2 SHEETS—SHEET 1

INVENTOR.
FRANK P. RUSSO
BY Joseph B. Sanders
atty.

Jan. 27, 1953 F. P. RUSSO 2,626,644
OVERLOAD RELEASE FOR PITTER DRIVE MECHANISMS
Filed Aug. 9, 1949 2 SHEETS—SHEET 2
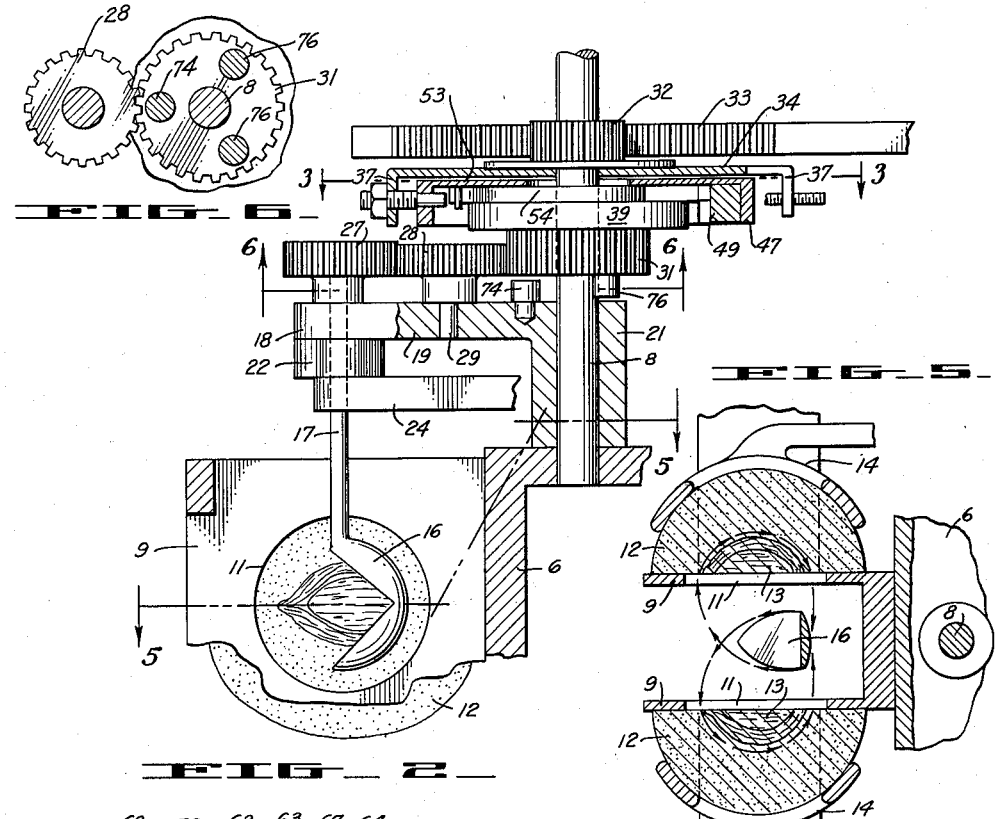
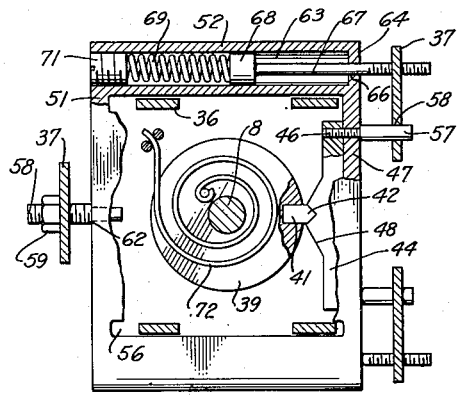
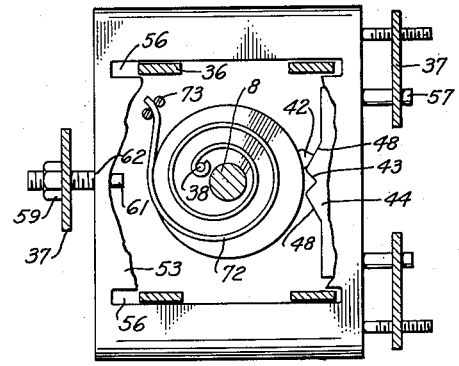
INVENTOR.
FRANK P. RUSSO Patented Jan. 27, 1953

2,626,644

UNITED STATES PATENT OFFICE 2,626,644

OVERLOAD RELEASE FOR PITTER DRIVE MECHANISM

Frank P. Russo, Castro Valley, Calif., assignor of fifty-two one-hundredths to F. M. Ball & Co., Oakland, Calif., a corporation of Nevada Application August 9, 1949, Serial No. 109,300

6 Claims. (Cl. 146—28)

1

This invention relates to rotation transmitting devices releasable under torque stresses exceeding a safe prescribed maximum value.

An object of the invention is to provide a device of the class described adapted particularly for embodiment in a machine for pitting fruit, such as peaches, so as to afford protection against deformation or breakage of the comparatively fragile pitting cutter thereof and to preserve fruit sections against mutilation.

Another object of the invention is to provide torque transmission apparatus of the type referred to which is sufficiently sensitive to instantly operate in releasing driving force to the pitting cutter in the event that a fruit pit exceeding the excision range of the cutter is encountered.

A further object of the invention is to provide a safety mechanism for driving a cutter in the excision of pit section from halved fruits such as peaches presented in pairs to the cutter, which is capable of discriminating between the presented fruit halves in tripping and suspending excision of one fruit half, if the pit section thereof is abnormally positioned relative to the pitting cutter and, while tripped, subsequently excising the other fruit half if the pit section thereof happens not to exceed said maximum size or lies wholly within the path operatively traversed by the cutter.

Still another object of the invention is to provide an overload release device of the nature referred to which is capable of cyclic operation, between released and reset conditions, at comparatively high speed.

Another and important object of the invention is to provide mechanism of the character described for use in a fruit pitting machine which, unlike presently available mechanisms of this type capable of handling more than one fruit section during a single cycle of operation, and which will reject all fruit sections in the event that one of the latter is not capable of being properly pitted, will select those sections which are capable of being pitted with the result that ultimate production from the machine is realized.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

Referring to the drawings:

Figure 2 is a reduced scale vertical sectional view taken in the plane indicated by the line 2—2 of Figure 1.

Figure 3 is a horizontal sectional view taken in the plane indicated by the line 3—3 of Figure 2 showing the overload release in engaged condition. Portions of the view are broken away so as to more clearly disclose internal details of construction.

Figure 4 is a view similar to Figure 3 and showing the overload release mechanism in tripped condition.

Figure 5 is a reduced scale horizontal sectional view taken in the plane indicated by the line 5—5 of Figure 2.

Figure 6 is a horizontal sectional view taken in the plane indicated by the line 6—6 of Figure 2.

Figure 1:
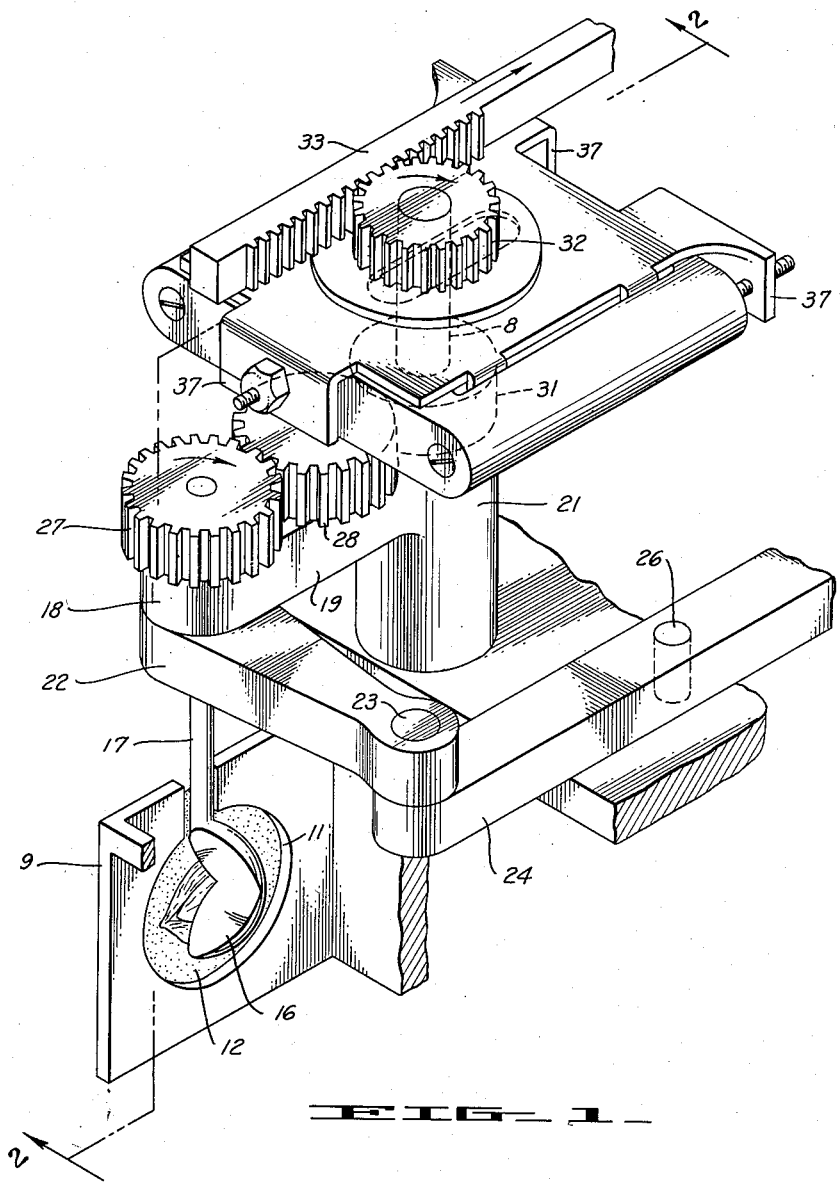
Figure 1 is a portional perspective view of the fruit-positioning and pit-excising components of a fruit pitting machine showing the application of the overload release mechanism of my invention to the drive for actuating the pit-excising cutter.

The overload release mechanism of my invention is capable of inclusion as a coupling device between torque-transmitting drive and driven elements in a wide variety of mechanisms but is designed particularly for use in connection with fruit pitting machines of the type, familiar to those skilled in the art, wherein excision of sections of pits contained in halves of the fruit previously bisected, is accomplished by means of a spoon-shaped cutter relatively oscillated to perform the cutting operation. The portions of such a machine, essential to the illustration and description of my invention, are best shown in Figures 1 and 2 and comprise the main supporting frame 6 from an upper portion of which extends the axially vertical pitter column 8 and from a subjacent portion of which extend the parallel positioning plates 9 spaced apart horizontally and equidistantly on either side of the vertical axis of the column 8. Each positioning plate 9 has therein a central opening 11 through which fruit halves 12 each containing a pit half-section 13 and held against the outer sides of the positioning plates by gripper jaws 14 or the like devices, may be reached by a spoon-shaped cutter 16 movable in an arcuate path across and through each opening 11 so as to cut into the fruit flesh peripherally adjacent the pit sections 13 and thereby excise the latter from the fruit halves. The spoon cutter 16 is carried by and preferably formed integrally with an axially vertical stem 17 journaled, adjacent its upper end, in the distal end portion 18 of a radius arm 19 the opposite or fulcrum end of which is secured to and extends radially from a sleeve 21 journaled for free rotational movement on the column 8. To the distal end of the lever 19 is pivotally attached a link 22 fitted at its other end with a pivot pin 23 carried by the outer end of an oscillating lever 24 fulcrumed on the frame 6 by means of a pin 26 and, as well known in the art, being actuated by the main drive of the pitting machine and timed in sequence with deliveries of fruit halves by the grippers 14 to the sides of the positioning plates 9. The upper end of the cutter stem 17 is suitably secured to and rotatable with a gear 27, disposed above and journaled on the radius arm 19, which meshes with a similar idler gear 28 journaled on a stud shaft 29 secured to and rising from the radius arm, the latter gear in turn being in mesh with a larger gear 31 freely journaled on an upward extension of the column 8. A drive gear 32 journaled on a more elevated portion of the column extension is operatively connected with the cutter spoon, as will presently be described in detail, and meshes with a toothed rack 33 capable of oscillatory movement longitudinally in proper time with movements of the oscillating lever 24 so as to move the cutter 16 alternately in opposite directions and through complete cycles of rotation. The mechanism so far described comprises conventional pitting machine structure and serves to establish the environment for discussion of the structural additions of my invention.

Secured to and rotatable with the gear 31 is a planar horizontal and substantially rectangular face plate 34 provided, on opposed edges thereof, with similarly downturned parallel lugs 37. Overlying the gear 31 and secured for rotational movement therewith by an axially vertical pin 38 spaced radially outwardly from the rotational axis of the former gear, is a clutch disk 39 suitably affixed to which is a radially-extending clutch spur 41 composed preferably of hardened steel and having at its distal end a vertically-ridged V-shaped tooth 42 complementary with and releasably engageable in a clutch notch 43 formed in a similarly hardened block 44 attached by mounting screws 46 to a substantially rectangular clutch casing 47 interposed between the clutch disk 39 and the face plate 34. The block 44 also has thereon oppositely inclined guide surfaces 48 leading to and terminating at opposite sides of the clutch notch 43. Formed in the casing 47 is a downwardly opening recess 49 bordered by side wall portions 51 and by comparatively horizontally thicker end wall portions 52 joined by an integral web 53 closing the upper end of the recess and provided with a diametrically enlarged opening 54 through which the column 8 passes. The web 53 is also provided with horizontally elongated slots 56 for receiving the flanges 36 and in which the latter are slidable so as to permit a degree of horizontal relative movement between the casing 47 and the face plate 34 and clutch disk 39. The mounting screws 46, which secure the block 44 to one of the side wall portions 51 of the casing 47, have axially extended cylindrical head portions 57 slidably engaged in guide apertures 58 provided in each of a pair of the lugs 37 so as to prevent relative rotational movement between the casing 47 and face plate 34 while permitting the aforesaid relative horizontal movement therebetween, and a stop screw 58, threadedly engaged with another of the lugs 37 and capable of being locked thereto by means of a jam nut 59 or similar device, is provided at its inner end with an extension stud 61 slidably engaged in a receiving aperture provided therefor in another side wall portion 51 of the casing and performs, in part a similar keying function to that of the screw heads 57. The difference, however, is that the shoulder 62 of the stop screw 58 in engaging the outer surface of the casing limits the degree of horizontal movement of the latter in one direction relative to the clutch disk 39 and consequently governs the degree of engagement of the tooth 42 in its complementary notch 43 of the clutch block 44. Each of the thicker end wall portions 52 of the casing is provided with a horizontally extending bored recess 63 having a closure end wall 64, facing the lugs 37 engaged by the slidable screw heads 57, which is fitted with a smaller guide aperture 66 in which is slidable a stem 67 threadedly engaged at its outer end in the adjacent lug 37 and having at its inner end a cylindrical head 68 slidable in the recess 63. A coiled expansion spring 69 engaging the head 68 is disposed in the recess and is confined therein by a diametrically slotted plug 71 threadedly engaged with the casing 47 and closing the end of the recess 63. The arrangement of the parts is such that the springs 69 exert pressure to urge the casing 47 horizontally relative to clutch disk 39 and face plate 34 thus interengaging the tooth 42 and notch 43 with a degree of pressure determined by the expansive force stored in the springs which may be selectively regulated by advancement or retraction of the pressure adjustment plugs 71. It will be thus seen that the gears 31 and 32 are interconnected for corresponding rotational movements while the clutch tooth 42 is in engagement with its complementary notch 43 of the clutch block 44, the degree of torque capable of being transmitted being governed by the pressure exerted by the pressure of the springs 69 in forcibly engaging the tooth in the notch, the tooth being caused to snap out of the notch if, at any time, an abnormal resistance to rotation is imposed on the driven or pitting cutter shaft 17.

When normal conditions obtain and fruit sections 12 are being operated upon in which the pit halves 13 are not overly large or abnormally positioned in the fruit sections, the clutch tooth 42 will be maintained in engagement with its mating notch 43 and consequently the pitting cutter 16, at the extremities of its sidewise oscillating movement imparted thereto by actuation of the lever 24, will be caused to complete alternately opposite rotational movements, by virtue of oscillatory movements of the rack 33, and will thereupon cut into the fruit sections and excise the pit halves therefrom. If, in the course of operations, a fruit section is encountered in which the pit half 13 is either larger than normal or is in abnormally positioned relation to the bulk of the fruit flesh so that a considerable portion of the pit lies across the path of movement of the cutter, the latter in striking the obstructing pit will be halted sufficiently in its cutting movement to cause torque reaction between the drive gear 32 and the driven gear 31 thereby causing the clutch tooth 42 to snap out of engagement with the notch 43 and thereby so reduce torque transmission to the pitting cutter that the latter will be immobilized during the subsequent movement of the rack member 33 in the completion of the partial cyclic movement thereof which would normally cause the pitting cutter to move into and through the fruit section.

Means is provided, operative upon release of the clutch tooth 42 from its mating notch 43, for biasing the tooth so as to urge the latter to assume a reset position in reengagement with the notch, and means is further provided for positively and forcibly bringing the clutch tooth and notch into relative reengagement upon the completion of a cyclic reciprocation of the rack element 33 in moving the pitting cutter through successive reversals of rotation. Engaged at one end with the pin 38, carried by the clutch disk 39 and movable therewith orbitally about the axis of the column 8 is a spiral spring 72 having its opposite end engaged and slidably anchored between a pair of relatively spaced pins 73 secured to and extending downwardly from the web 53 of the casing 47, the spring being normally unflexed when the clutch tooth 42 is in seating engagement with its mating notch 43 and being of such length as to permit of contractive coiling thereof sufficient to permit at least a half turn of revolution of the clutch disk relative to the casing 47 which, of course, is equivalent to effecting corresponding rotational displacement between the gears 31 and 32. Secured in the arm 19 and rising therefrom at a point spaced radially outwardly from the axis of the column 8 is a relatively fixed stop pin 74 underlying the gear 31 and disposed in the orbital path of movement of and engageable by circumferentially spaced reset pins 76 secured to and projecting downwardly from the bottom face of the latter gear. The relative positions of the pins 74 and 76 is best shown in Figure 6 and herein it will be noted that the relative diameters of the gears 27 and 31 is such that a complete revolution of the former gear will be made while the latter gear has completed only a portion of a complete revolution, which governs the peripheral spacing between the pins 76 so that during each revolutionary cycle of the gear 27 the pins 76 will alternately move toward and into engagement with opposite sides of the stop pin 74. This limits the pitting cutter 16 to single complete revolutions in opposite directions. If the pitting cutter, as previously explained, should encounter an oversized or displaced pit section so that the clutch tooth 42 is caused to snap out of its mating notch 43, the function of torque transmission will be immediately delegated to the spring 72 which, since the obstructed cutter cannot progress in a normal cutting movement, continues to flex so as to permit the rack 33 and its gear 32, together with their positively interconnected casing and face plate elements 47 and 34 respectively, to complete their half-cycle movements in a normal manner. Upon sidewise swinging of the radius arm 19 preparatory to bringing the cutter into pitting relationship with the oppositely held fruit section, the flexed spring 72 will unwind as the cutter moves away from the obstructing pit section with the result that the cutter will be returned substantially to its normal starting position ready for the next pitting cut. When the clutch tooth 42 was tripped from engagement with its notch, the pitting cutter, which in normal operaion with the clutch tooth engaged is in phase synchronism as regards its limits of rotational movement with respect to the similar movement of the driving gear 32, was given a slight degree of phase displacement as compared with the latter gear thereby causing the cutter to lag somewhat behind the movement of the gear. When the cutter is shifted toward and to operate on the opposite fruit section, this phase lag of the cutter, due to the reverse cyclic movement of the rack 33 and gear 32 will be converted to phase advancement. If as happens in most cases, the pit of the second fruit section is also oversize or is obstructionally displaced, the pitting cutter will be again prevented from rotating in which case the clutch tooth 42 will move successively through reset position in reengagement with the notch 43 and to released position out of the notch to rest against the cam surface 48 opposite to that previously engaged. However, if the pit of the second fruit section should be of such a size as to permit passage of the cutter in a normal way, the reaction pressure of the cutter in penetrating the fruit flesh and excising the pit will be insufficient to cause resetting of the clutch tooth in its mating notch and consequently a successful pitting action will occur. Upon reaching the end of its rotational movement, after completing a pit excision, the phase advanced cutter will be positively stopped by virtue of one of the gear pins 76 coming into engagement with the stop pin 74. At this point, it will be remembered, the phase lagging rack 33 and gear 32 have not yet completed their corresponding cyclic movement with the result that the continued movement of the latter elements, in relation to the positively stopped cutter and its fixedly associated clutch disk 39, will cause the clutch tooth 42 to be forcibly moved into reset or reengagement with the notch 43 thereby reestablishing normal interengagement of the transmission parts preparatory to starting the following pitting cycles.

It will be particularly noted that two degrees of torque transmission are available in the mechanism of my invention, the first or normal degree being provided with the clutch tooth 42 engaged in its mating notch 43 so that maximum torque transfer between the drive rack 33 and the pitting cutter 16 obtains while the second stage occurs with the clutch tooth released and providing a lesser amount of torque transfer, although sufficient to effect pitting of a fruit section in which proper conditions exist, by means of the spring 72 alone. Thus under all operating conditions protection of the rather fragile cutter is afforded but at the same time, due to the discriminating action of the latter in continuing its cutting function in the event that at least one fruit section is capable of being properly pitted, a minimum loss in production time is suffered. This is in marked contrast to some conventional machines, provided with no safety release, in which cutter damage or fruit mutilation are possible and to other machines which either require stoppage and resetting of a trip mechanism in the event that abnormal conditions as set forth above are encountered or in which, due to a tripped cutter, both fruit sections are rejected even though one section may be capable of being properly pitted.

I claim:

1. In a fruit pitting mechanism having a rotatable pitting cutter capable of movement in a relatively unobstructed arcuate path through a portion of fruit for excising therefrom a pit section disposed radially within said path, a rotatable drive element, and means connected with and to move said drive element through cycles of rotational reciprocation; friction clutch means positively interconnecting said drive element and pitting cutter for transmitting prescribed maximum torque therebetween and releasable upon engagement of said pitting cutter with a pit section, a flexible element interposed between said pitting cutter and drive element for transmitting a lesser degree of torque therebetween upon release of said friction clutch means, and means operative at a point in the cycle of reciprocation of said drive element for reengaging said released friction clutch means.

2. In a fruit pitting mechanism having a rotatable pitting cutter capable of movement in a relatively unobstructed arcuate path through a portion of fruit for excising therefrom a pit section disposed radially within said path, means for prescribing limits of reciprocative movement of said pitting cutter, a rotatable drive element, and means connected with and to move said drive element through cycles of rotational reciprocation; friction clutch means interconnecting said drive element and pitting cutter for transmitting prescribed maximum torque therebetween and completely releasable upon engagement of said pitting cutter with a pit section, a flexible connecting element independent of said friction clutch means interconnecting said pitting cutter and drive element for transmitting reduced torque therebetween upon release of said friction clutch means, and said movement limiting means of the pitting cutter being cooperative with said drive element moving means for reengaging said released friction clutch means at a point in the cycle of movement of the drive element.

3. In a fruit pitting mechanism having a rotatable pitting cutter capable of movement in a relatively unobstructed arcuate path through a portion of fruit for excising therefrom a pit section disposed radially within said path, a rotatable drive element, and means connected with said drive element and reciprocably movable for rotatively reciprocating said drive element; a clutch element engaged and rotatable with said pitting cutter, a clutch element on said drive element yieldable relative to the clutch element of the pitting cutter and releasably engaged therewith for imparting movement between the drive element and the pitting cutter, said clutch elements being relatively releasable upon engagement of a pit section by said pitting cutter, a fixed stop element, movable stop elements carried by said pitting cutter and alternately engageable with the fixed stop element so as to fix the limits of rotational reciprocation of said pitting cutter, said fixed and movable elements being cooperative with said drive element reciprocating means and at a point in the cycle of movement thereof for reengaging said released clutch elements, and means interposed between said pitting cutter and drive element for maintaining torque transmission relationship therebetween.

4. In a fruit pitting mechanism having a rotatable pitting cutter capable of movement in a relatively unobstructed arcuate path through a portion of fruit for excising therefrom a pit section disposed radially within said path, a rotatable drive element, and means connected with said drive element and reciprocably movable for rotatively reciprocating said drive element; a clutch element engaged and rotatable with said pitting cutter, a clutch element on said drive element yieldable relative to the clutch element of the pitting cutter and releasably engaged therewith for imparting movement between the drive element and the pitting cutter, said clutch elements being relatively releasable upon engagement of a pit section by said pitting cutter, a fixed stop element, movable stop elements carried by said pitting cutter and alternately engageable with the fixed stop element so as to fix the limits of rotational reciprocation of said pitting cutter, said fixed and movable elements being cooperative with said drive element reciprocating means and at a point in the cycle of movement thereof for reengaging said released clutch elements, spring means interposed between said pitting cutter and drive element, said spring means being inactive during interengagement of said clutch elements and being active to provide a yieldable torque transmission connection between the pitting cutter and drive elements when said clutch elements are disengaged.

5. In a fruit pitting mechanism having a rotatable pitting cutter capable of movement in a relatively unobstructed arcuate path through a portion of fruit for excising therefrom a pit section disposed radially within said path, a rotatable drive element, and means connected with said drive element and reciprocally movable for rotatively reciprocating said drive element; a clutch disk connected and rotatably movable with said pitting cutter, said clutch disk having thereon radially disposed clutch and anchor elements, cooperative clutch and anchor elements carried and rotatable with said drive element, said clutch elements being respectively engageable and releasable to interconnect said pitting cutter and drive elements for rotary movement in unison and to disconnect said drive element and cutter upon engagement of a pit section by the latter, a fixed stop element, peripherally spaced stop elements carried by and rotatively movable with said pitting cutter and engageable with said fixed stop element during such movement for prescribing limits of rotational movement of said pitting cutter, a spring member interposed between said anchor elements interconnecting said drive element and pitting cutter for yieldably transmitting torque therebetween when said clutch elements are relatively disengaged, and said stop elements being relatively arranged when said clutch elements are disengaged to stop movement of said pitting cutter before said drive element reciprocating means so additional movement of the latter will forcibly bring said clutch elements into relative engagement.

6. In a machine for removing pit sections from halved fruits, having a rotatable pitting cutter capable of movement in a relatively unobstructed path through each of said portions of fruit for excising therefrom the pit section disposed radially within said path, a rotatable drive element, and means connected with and to move said drive element through cycles of rotational reciprocation; friction clutch means interconnecting said drive element and pitting cutter for positively transmitting maximum torque therebetween, said means including members carried by and movable with said drive element and said cutter respectively, one of said members being a toothed element and the other of said members having a recess for receiving said element, means effecting release of said members upon engagement of said pitting cutter with a pit section, a flexible element interposed between said pitting cutter and drive element for transmitting a lesser degree of torque therebetween upon release of said members, and means operative at a point in the cycle of reciprocation of said drive element for reengaging said members.

FRANK P. RUSSO.

REFERENCES CITED

The following references are of record in the file of this patent:

UNITED STATES PATENTS

| Number | Name | Date |
|---|---|---|
| 1,537,628 | Street | May 12, 1925 |
| 1,785,002 | Duncan | Dec. 16, 1930 |
| 1,785,022 | Duncan | Dec. 16, 1930 |
| 2,164,870 | Salardi | July 4, 1939 |
| 2,376,526 | Thompson | May 22, 1945 |

FOREIGN PATENTS

| Number | Country | Date |
|---|---|---|
| 23,123 | Great Britain | 1908 |